US009651371B2

United States Patent
Watanabe

(10) Patent No.: US 9,651,371 B2
(45) Date of Patent: May 16, 2017

(54) INCLINATION ANGLE CALCULATION DEVICE

(75) Inventor: Yutaka Watanabe, Tokyo (JP)

(73) Assignee: NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 1152 days.

(21) Appl. No.: 13/513,185

(22) PCT Filed: Dec. 3, 2010

(86) PCT No.: PCT/JP2010/007060
§ 371 (c)(1),
(2), (4) Date: Aug. 20, 2012

(87) PCT Pub. No.: WO2011/067939
PCT Pub. Date: Jun. 9, 2011

(65) Prior Publication Data
US 2012/0310594 A1 Dec. 6, 2012

(30) Foreign Application Priority Data
Dec. 4, 2009 (JP) ................. 2009-276613

(51) Int. Cl.
*G01C 9/02* (2006.01)
*G06F 15/00* (2006.01)
(Continued)

(52) U.S. Cl.
CPC ............. *G01C 9/06* (2013.01); *B60W 40/112* (2013.01); *B60W 40/12* (2013.01);
(Continued)

(58) Field of Classification Search
CPC .......... G06F 3/0346; G06F 17/18; G01C 9/08
(Continued)

(56) References Cited

U.S. PATENT DOCUMENTS

| 6,157,295 A | 12/2000 | Steiner et al. |
| 2003/0102178 A1* | 6/2003 | Ide ................... B60R 21/0132 180/282 |

(Continued)

FOREIGN PATENT DOCUMENTS

| EP | 2 090 874 A1 | 8/2009 |
| JP | 05-124543 A | 5/1993 |

(Continued)

OTHER PUBLICATIONS

Imine et al., Rollover risk prediction of an instrumented heavy vehicle using high order sliding mode observer, May 2009, IEEE, 978-1-4244-2789-5/09, 64-69.*

(Continued)

*Primary Examiner* — John Breene
*Assistant Examiner* — Mohammad Islam
(74) *Attorney, Agent, or Firm* — Marshall, Gerstein & Borun LLP

(57) ABSTRACT

An inclination angle calculation device comprises a motion detector for detecting motions of a traveling object during travel, in two directions included in a cross-section surface of the traveling object, the two directions being orthogonal with each other; and an arithmetic unit for calculating an inclination angle of the traveling object during travel in the cross-section surface, using a frequency of the motion in one of the two directions and a rolling frequency in the other direction of the two directions.

14 Claims, 8 Drawing Sheets

(51) Int. Cl.
　　　*G01C 9/06*　　　(2006.01)
　　　*B60W 40/112*　　(2012.01)
　　　*B60W 40/12*　　　(2012.01)
　　　*B60W 30/04*　　　(2006.01)
　　　*G01M 1/12*　　　(2006.01)

(52) U.S. Cl.
　　　CPC . *B60W 2030/043* (2013.01); *B60W 2300/145* (2013.01); *B60Y 2200/147* (2013.01); *G01M 1/122* (2013.01)

(58) Field of Classification Search
　　　USPC .......................... 702/127, 141, 150, 152, 154
　　　See application file for complete search history.

(56) References Cited

U.S. PATENT DOCUMENTS

2004/0094913 A1* 5/2004 Flynn ................... B60G 17/017
　　　　　　　　　　　　　　　　　　　　　　　　　　280/6.153
2009/0099765 A1* 4/2009 Hong ..................... G01C 21/16
　　　　　　　　　　　　　　　　　　　　　　　　　　701/532
2012/0029783 A1* 2/2012 Takenaka ................ B60T 8/172
　　　　　　　　　　　　　　　　　　　　　　　　　　701/73

FOREIGN PATENT DOCUMENTS

| JP | 09-329437 A | 12/1997 | | |
|---|---|---|---|---|
| JP | 2007-163205 A | 6/2007 | | |
| JP | EP 2090874 A1 * | 8/2009 | ............ | B60W 40/12 |
| WO | WO-2008/062867 A1 | 5/2008 | | |

OTHER PUBLICATIONS

International Search Report for PCT/JP2010/007060, dated Mar. 15, 2011.

Search Report for EP 10 83 4392, dated Sep. 10, 2015.

* cited by examiner

INCLINATION ANGLE CALCULATION DEVICE

TECHNICAL FIELD

The present invention relates to an inclination angle calculation device capable of calculating the inclination angle of a traveling object during travel.

BACKGROUND ART

Highly accurate estimation of the inclination angle of a traveling object during travel (specifically, the central angle of rolling in a predetermined cross-section surface of a traveling object) is advantageous in the operation of the traveling object. Container cargo vehicle, which is an example of the traveling object, is used for transportation of container cargos imported and exported in the international commercial trading, and the inclination angle of the container cargo vehicle during travel, in a cross-section surface perpendicular to the travel direction of the container cargo vehicle, provides valuable data that directly reflects the biased loading of the cargos in the container. Thus, accurate estimation of the inclination angle is advantageous to prediction of possible collapse/falling of cargo piles that can take place when the door of the container is opened and unstable traveling of the vehicle on, for example, a curved road or due to malfunction of suspensions.

In this specification, the "biased loading" of the cargos in the container means the deviation of a load point determined by the center of gravity of the container cargo in a space depending on the disposition of the container cargo, and it does not mean the deviation of a load point on the plane bottom surface of the container as generally understood in container transportation business. (The "biased loading" in this specification is also referred to as "one-side loading" because of loaded state of cargos.)

Conventional technology of the inclination angle (inclination angle of road surface or inclination angle with respect to a horizontal surface) of a traveling object (movable object) during travel is disclosed in, for example, Patent Literatures 1 and 2.

In Patent Literature 1, correction is made for the inclination angle that is an angle with respect to a horizontal surface and is obtained by a rotation angle detector on the basis of the acceleration in the front/rear direction and left/right direction of a traveling object during travel.

In Patent Literature 2, a traveling object is determined to be in a stop state or in a traveling state with a constant speed when detection data series of an acceleration sensor is random, and the inclination angle of a road surface is calculated based on an output value of an acceleration.

CITATION LISTS

Patent Literature

Patent Literature 1: JP-A-H09-329437
Patent Literature 2: JP-A-2007-163205

SUMMARY OF THE INVENTION

Technical Problem

Besides the above Literatures, the angle calculation method using the time integration of angular velocity is well known as the most accurate technique in theory to provide real time position information of a traveling object.

Unfortunately, any types of angular velocity sensors have output variations caused by temperature characteristic, etc., and therefore, the angle of the traveling object cannot be calculated accurately by simple integration of output data from the angular velocity sensors. Accordingly, the accurate calculation of the angle of the traveling object generally requires a combination of a gyro that outputs angular velocity, with an acceleration sensor, an earth magnetism sensor and GPS, which are used to correct integral errors of the gyro, and the use of a highly accurate error correction algorithm such as Kalman filter. The gyro, however, is extremely expensive (five hundred thousand yen to multi-million yen), and thus installation of such an inclination angle calculation technology on a common traveling object such as a passenger car presents serious difficulty.

The inventor of the present invention has been working on a technical development aimed to fundamentally resolve such a social issue of a container transportation vehicle that is caused by biased loading of container cargos (e.g., collapse/falling of cargo piles that can take place when a door of the container is opened or unstable traveling of the container transportation vehicle on a curved road).

In the process of development of this technology, the inventor found out that the inclination angle of the container cargo vehicle during travel can be directly derived, without using the integration of angular velocity, by utilizing an appropriate conversion of a relational expression between the center of gravity in a predetermined cross-section surface of the traveling object and the frequencies of motions in two directions (for example, the frequencies of angular velocity) that are orthogonal with each other in this cross-section surface using these frequencies. This deriving method will be described in detail hereinafter.

The technology disclosed in Patent Literatures 1 and 2 is aimed to calculate such an actual inclination angle of the traveling object on a sloped road surface, which is visually checked. In contrast, the technology disclosed in this specification is aimed to calculate the central angle of rolling of the traveling object in a cross-section surface of the traveling object. Thus, Patent Literatures 1 and 2 are not referenced as prior technology of the present invention.

In this specification, the "inclination angle of the traveling object during travel" is mechanical-theoretically (dynamically) considered as an angle between a vertical center line (which will be described later) and a rolling center line (which will be described later) when the center of gravity of the traveling object deviates from the vertical center line in the cross-section surface, for example, in a case where the cross-section surface is a cross-section surface perpendicular to the travel direction of the traveling object. Obviously, the "inclination angle" in the present invention does not represent merely the visible inclination angle of the traveling object generated by the slope of the road surface, unlike the technology of Patent Literatures 1 and 2.

In addition, the technology disclosed in Patent Literatures 1 and 2 uses the acceleration of the traveling object in the calculation of the angle, and illogically includes the physical phenomenon of the primary polar coordinate system (rolling angular velocity) into the physical phenomenon of the linear system (acceleration). Such a calculation often presents serious round off errors of the coordinate system. For example, even when the traveling object receives wind pressure from lateral side, it disadvantageously affects the acceleration of the physical phenomenon of the linear system. Thus, when the angle of a traveling object is to be accurately calculated from the rolling angular velocity (frequency) of the polar coordinate system, the technology in Patent Literatures 1 and 2 is inevitably useless.

An object of the present invention, which has been accomplished to overcome those problems, is to provide an inclination angle calculation device than can simply and accurately calculate the inclination angle of a traveling object during travel without using integration of angular velocity.

Solution to Problem

To solve the above mentioned problem, an inclination angle calculation device of the present invention comprises a motion detector for detecting motions of a traveling object during travel, in two directions included in a cross-section surface of the traveling object, the two directions being orthogonal with each other; and an arithmetic unit for calculating an inclination angle of the traveling object during travel in the cross-section surface, using a frequency of the motion in one of the two directions and a rolling frequency in the other direction of the two directions.

The inclination angle calculation device having the configuration described above can easily and highly accurately calculate the inclination angle of the traveling object during travel without using the integration of angular velocity.

Therefore, in the inclination angle calculation device of the present invention, the motion detector can omit additional functions for the integration of the angular velocity and filtering, thereby remarkably reducing the cost of the motion detector. In addition, the inclination angle calculated by the inclination angle calculation device is such that each inclination angle corresponds to each frequency in a one-to-one correspondence. This can avoid random errors caused by the integration, filtering and statistical algorithm. Thus, the accuracy of the device is high.

In the inclination angle calculation device of the present invention, the cross-section surface may be perpendicular to a travel direction of the traveling object, and one of the two directions is a self-weight direction of the traveling object while the other direction is a width direction of the traveling object.

In this arrangement, the inclination angle provides valuable data that directly reflects the degree of biased loading of the traveling object. Accordingly, easy and highly accurate calculation of the inclination angle of the traveling object is advantageous in predicting collapse/falling of cargo piles in the traveling object and unstable travelling of the traveling object (for example, unstable travelling due to a curved road or malfunction of suspensions).

In the inclination angle calculation device of the present invention, the traveling object may be a container cargo vehicle towed by a towing vehicle.

The calculation of the inclination angle performed by the inclination angle calculation device of the present invention is very advantageous for current condition of container transportation service. The reasons thereof will be described hereinafter.

By the way, the formulation of the motion of an object generally includes two methods: one is recognition as an issue of a dynamics of mass system; the other is recognition as an issue of the dynamics of rigid body system. The dynamics of rigid body system, however, is based on the theory that a distribution of mass is even in the rigid body. Therefore, it appears to be inappropriate that the motion of the traveling object comprised of various components having different sizes and shapes is recognized as the issue of the dynamics of rigid body system.

In view of the above, the inventors of the present invention found out that by categorizing the motion of the traveling object as the issue of the dynamics of mass system in which the center of gravity of the traveling object is designated as a mass point, the inclination angle of the traveling object during travel can be derived properly without using the integration of angular velocity.

The inclination angle in the present invention, however, is formulated by, but is not limited to, the expressions exemplified in the embodiment, and can be formulated by various expressions as long as requirement of the dynamics of mass system is satisfied as described below. The second modified example, for example, which will be described hereinafter, describes a formulation method of the inclination angle that is different from a formulation method described in the embodiment.

In the inclination angle calculation device of the present invention, when the motion in the self-weight direction corresponds to a vertical reciprocation motion in which a center of gravity of the traveling object is a mass point, the motion in the width direction corresponds to a horizontal simple pendulum motion in which an axle center of the traveling object in the width direction is a support point, and the center of gravity of the traveling object is a mass point, the arithmetic unit may convert output data of the motion detector into rolling data that represents a correlation between a frequency and an amplitude of the simple pendulum motion, and obtains frequency of the simple pendulum motion in correspondence with a peak amplitude of the simple pendulum motion which is derived from a predetermined width dimension of the traveling object on the basis of the rolling data, further convert the output data of the motion detector into pitching data that represents a correlation between a frequency and an amplitude of the reciprocation motion, and obtain a frequency of the reciprocation motion corresponding to a maximum amplitude of the reciprocation motion on the basis of the pitching data, and derive a central angle of the simple pendulum motion as the inclination angle using the predetermined width dimension of the traveling object, the obtained frequency of the simple pendulum motion, and the obtained frequency of the reciprocation motion.

In the inclination angle calculation device of the present invention, the motions in two directions may be movements due to external disturbances applied to the traveling object during travel on a road surface by irregularities of the road surface.

The traveling condition of the road surface can be artificially made by, for example, rotation of a rotating roll provided with irregularities.

In this arrangement, the traveling object is caused to travel as desired on the road surface in accordance with normal flow, and thus, the inclination angle calculation device of the present invention can easily calculate the inclination angle of the traveling object during travel.

In the inclination angle calculation device of the present invention, the motion detector may include an angular velocity sensor mounted on the traveling object, angular velocity sensitive axes of the sensor being adjusted in the two directions.

Accordingly, the motion detector can be comprised of an inexpensive biaxial angular velocity sensor.

The object described above, other objects, features and advantages of the present invention will be disclosed from the preferred embodiments described below with reference to the attached drawings.

Advantageous Effects of the Invention

The present invention provides an inclination angle calculation device that can easily and highly accurately calculate the inclination angle of a traveling object during travel, without using integration of the angular velocity.

DESCRIPTION OF THE EMBODIMENTS

Figures 1A, 1B:
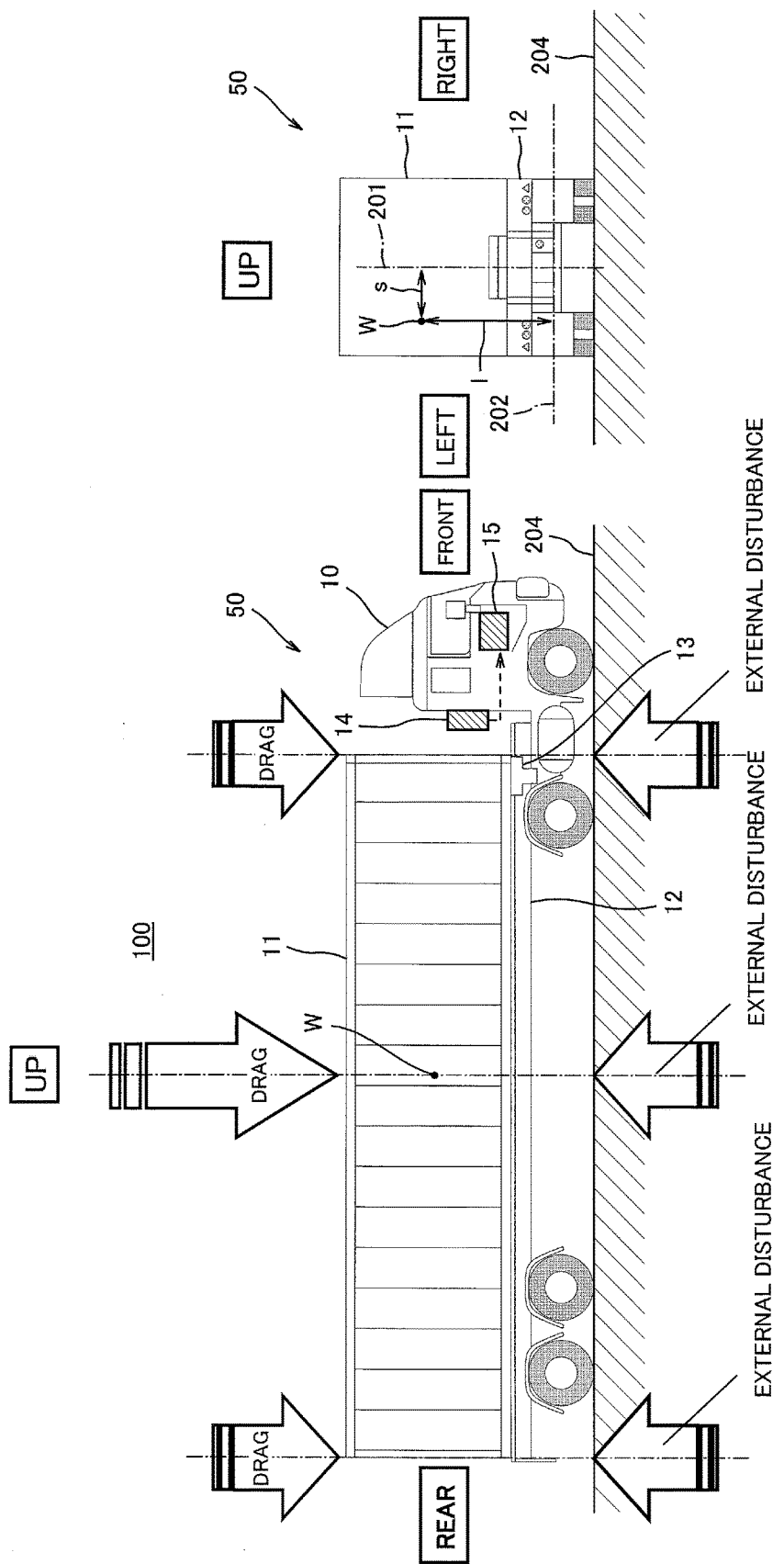
FIG. 1 is a schematic illustration showing an exemplified configuration of an inclination angle calculation device according to an embodiment of the present invention.

An embodiment of the present invention will be described below with reference to the drawings.

Throughout the drawings, the same reference numerals are assigned to the same or corresponding components illustrated, and the descriptions of the same or corresponding components are sometimes omitted.

The present invention is not limited to the embodiment below. The detailed descriptions described below merely exemplify the features of the inclination angle calculation device of the invention. When a specifically exemplified device below is described using specific wordings, with reference numerals, each of which corresponds to the corresponding component specifying the inclination angle calculation device of the invention, such a device is merely an example of the components of the inclination angle calculation device of the invention.

For example, the "container transportation vehicle (container cargo vehicle) 50" described below is merely an example of the "traveling object" that is a component of the device of the invention.

Accordingly, the technology described in this specification can be applied to various transportation means including trucks, busses, passenger cars, railway vehicles, ships and airplanes (for example, during landing and takeoff) besides the container transportation vehicles (container cargo vehicles). For example, the technology applied to the passenger car is described hereinafter as a first modified example of the invention.

In this specification, the container cargo vehicle refers to a container transportation vehicle excluding a towing vehicle, and thus it refers to a vehicle including a container capable of loading cargos and a container chassis (carriage) for loading the container.

Embodiment

FIG. 1 is a schematic illustration showing an example of the configuration of the inclination angle calculation device according to an embodiment of the invention. FIG. 1A shows the inclination angle calculation device viewed from the width direction (lateral side) of the container cargo vehicle whereas FIG. 1B shows the inclination angle calculation device viewed from the rear side of the container cargo vehicle.

Some of the drawings illustrate "UP" and "DOWN" to indicate the direction along which the self-weight of the container cargo vehicle is applied, "LEFT" and "RIGHT" to indicate the width direction of the container cargo vehicle, and "FRONT" and "REAR" to indicate the travel direction of the container cargo vehicle. The description below sometimes uses "up/down direction" instead of the "self-weight direction", "left/right direction" instead of the "width direction", and "front/rear direction" instead of the "travel direction".

As illustrated in FIG. 1, the inclination angle calculation device 100 includes a container transportation vehicle 50, a motion detector 14, and an arithmetic unit 15. The motion detector 14 is capable of detecting the motion of the container cargo vehicle during travel, in the up/down direction (vertical direction) (self-weight direction), i.e., a vertical shake of the container cargo vehicle during travel, and the motion of the container cargo vehicle during travel, in the left/right direction (width direction), i.e., rolling of the vehicle during travel. The motion detector 14 is thus configured to detect the motions in two directions (the self-weight direction and the width direction in this case) that are orthogonal with each other and are included in a cross-section surface of the container cargo vehicle (the cross-section surface illustrated in FIG. 1B in this case).

Typical example of the container transportation vehicle 50 is a trailer truck that includes a tractor 10 as a towing vehicle.

In this embodiment, trailer truck transportation is exemplified in which a tractor tows a container chassis that loads a marine container of 40 feet (worldwide standard specification), and the configuration and operation of the container transportation vehicle 50 will be described below.

As illustrated in FIG. 1A, the trailer truck 50 includes a cuboid container 11 capable of loading a container cargo (not shown), a container chassis 12 that loads the container 11 and is used as an carriage, and a tractor 10 (towing vehicle) coupled to the container chassis 12 to tow or drive the container chassis 12.

The tractor 10 includes a disc-shaped coupler 13 (coupling member) that couples the container chassis 12 to the tractor 10 such that the tractor 10 and the container chassis 12 can swing in the left/right direction via the coupler 13.

It should be noted that the detection technology of the inclination angle according to the embodiment of the invention can be theoretically employed regardless of whether the container 11 is loaded with a container cargo or unloaded with it. Accordingly, the container 11 in the specification includes both a container with a cargo loaded thereon and a container without a cargo.

The configuration of the trailer truck 50 illustrated in FIG. 1 is merely an example, and thus the detection technology according to the embodiment of the invention can be used for various types of trailer trucks.

Figure 2:
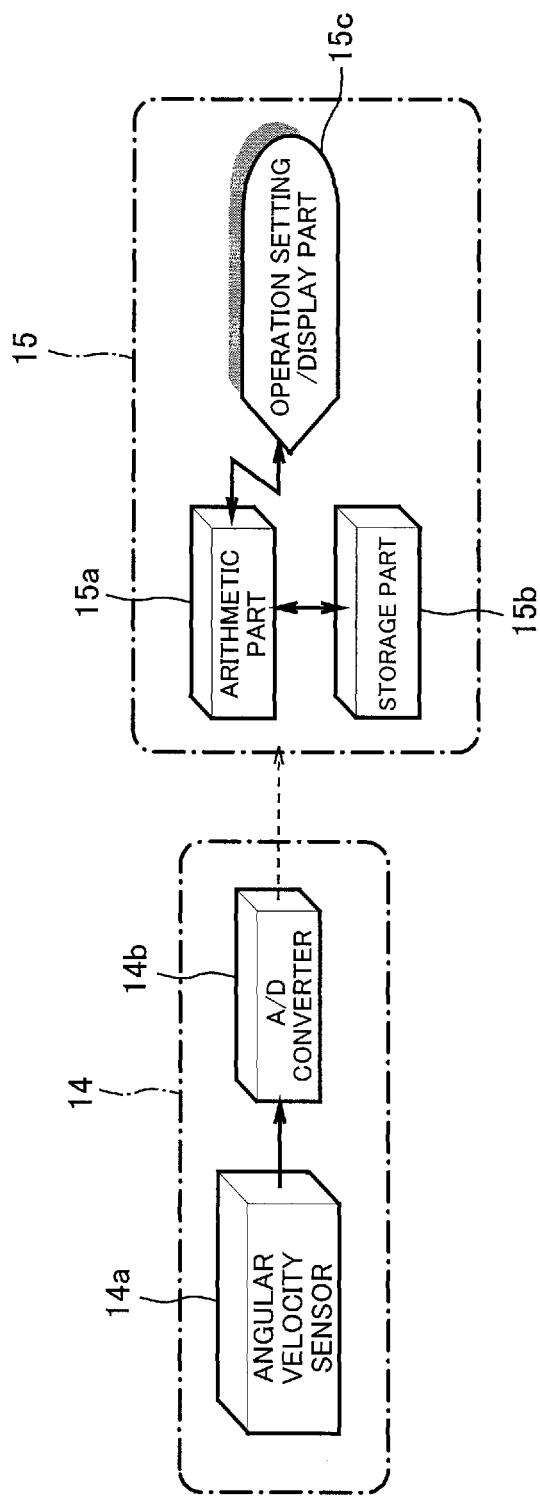
FIG. 2 is a block diagram showing an example of internal configurations of a motion detector and an arithmetic unit that are included in the inclination angle calculation device according to the embodiment of the present invention.

FIG. 2 is a block diagram showing an example of the internal configurations of the motion detector and the arithmetic unit in the inclination angle calculation device of the embodiment.

The motion detector 14 is attached to the center in the left/right direction of the trailer truck 50 at the side of the tractor 10 and the location that does not disadvantageously affect the transportation operation (e.g., near the coupler 13). The arithmetic unit 15 is disposed in a desired location in the cabin of the tractor 10. The motion detector 14 and the arithmetic unit 15 are connected together via cable communication or radio communication through data input/output ports (not shown) so as to transmit data.

As illustrated in FIG. 2, the motion detector 14 includes a biaxial (2-D) angular velocity sensor 14a having angular velocity sensitive axes that are adjusted, to detect the motions in the up/down direction and the width direction of the container cargo vehicle during travel of the trailer truck 50, and an A/D converter (analog/digital converter) 14b which converts analog data signal outputted from the angular velocity sensor 14a into digital signal.

The volume of the angular velocity signal digitalized by the A/D converter 14b is proportional to the angular velocity of the motion in the up/down direction or the width direction of the container cargo vehicle during travel of the trailer truck 50. The biaxial angular velocity sensor 14a may be comprised of, for example, a crystal tuning fork sensor or a vibration sensor.

Although, the exemplified motion detector 14 in this embodiment contains the A/D converter 14b therein to utilize the motion detector 14 conveniently, this A/D converter 14b can be installed outside the motion detector 14. In addition, the motion detector 14 contains various signal processing circuits including filters and amplifiers (which are not shown). Those circuits are commonly used, and thus the descriptions thereof are omitted in this specification.

As illustrated in FIG. 2, the arithmetic unit 15 includes an arithmetic part 15a comprised of a microprocessor, a storage part 15b comprised of ROM (read-only memory), RAM (random-access memory), etc., and an operation setting/display part 15c. Examples of the arithmetic unit 15 include a personal digital assistant such as a notebook type personal computer.

The storage part 15b is connected to the arithmetic part 15a, and stores the program to properly derive the inclination angle of the container cargo vehicle during travel and constants for input (which will be described later) to be used in the calculation.

The arithmetic part 15a operates according to the program for calculation of the inclination angle prestored in the storage part 15b, and derives the inclination angle of the container cargo vehicle during travel on the basis of the digital signal outputted from the motion detector 14 (the A/D converter 14b), which will be described later.

The operation setting/display part 15c includes an operation part (e.g., a key board (not shown)) having setting buttons thereon for inputting the constants, and an informing device such as a liquid crystal panel screen and a speaker (which are not shown). The informing device provides the output data of the inclination angle of the container cargo vehicle during travel, outputted from the arithmetic part 15a to an operator (driver or passenger) by means of visual information or sound information so that the operator can check it.

The method of deriving the inclination angle of the container cargo vehicle will be described with reference to the drawings.

Figure 3:
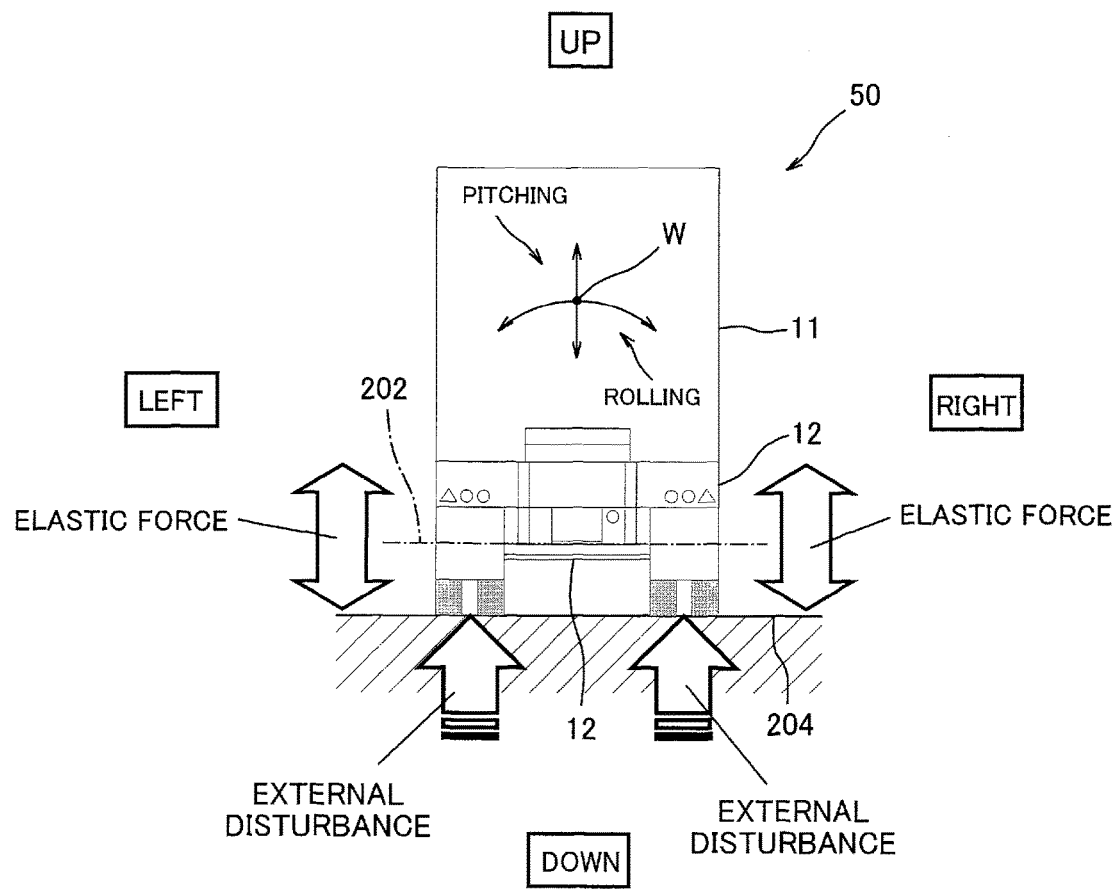
FIG. 3 is a schematic diagram that describes a method of deriving the inclination angle of a container cargo vehicle during travel by means of the inclination angle calculation device according to the embodiment of the invention.
Figure 4:
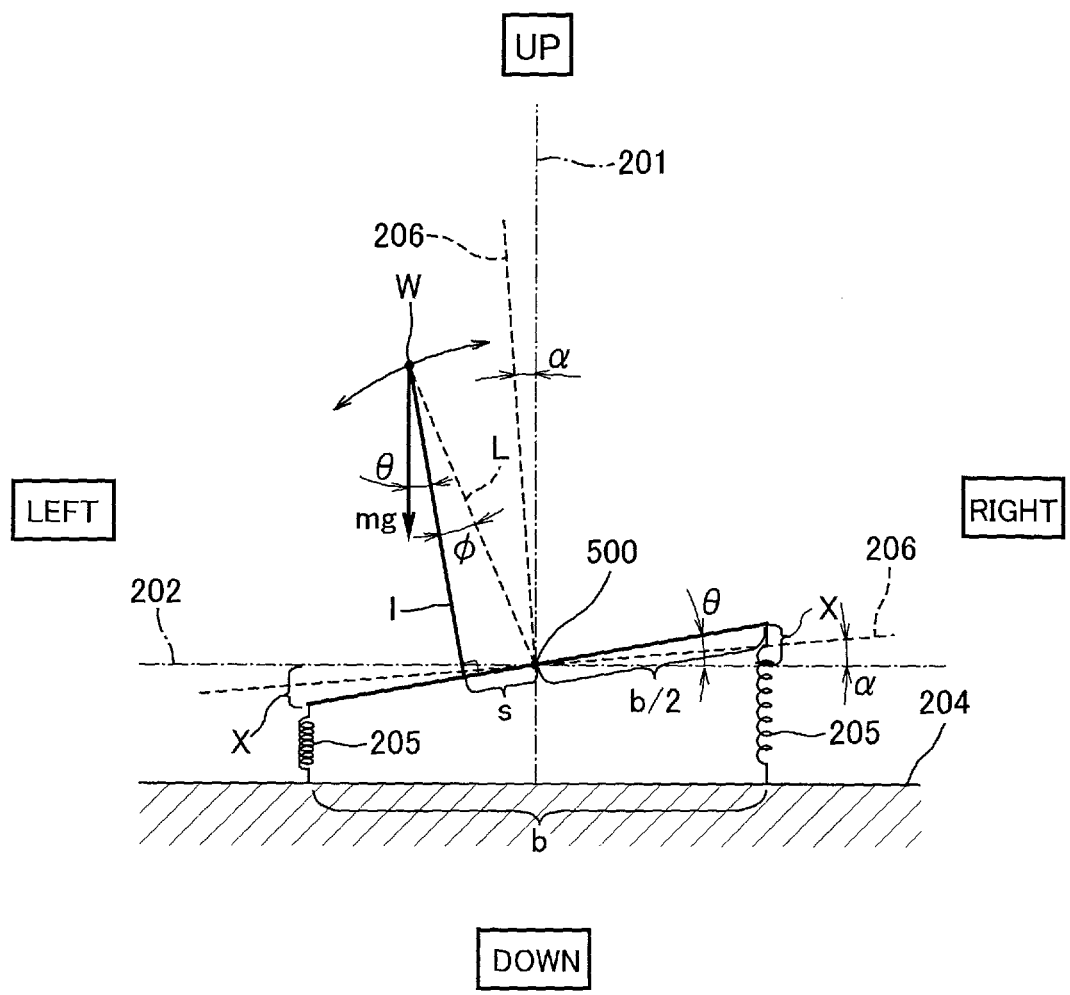
FIG. 4 is a schematic diagram that describes the method of deriving the inclination angle of the container cargo vehicle during travel by means of the inclination angle calculation device according to the embodiment of the invention.

FIGS. 3, 4 and 5 are schematic diagrams that describe the method of deriving the inclination angle of the container cargo vehicle during travel, using the inclination angle calculation device according to the embodiment. These diagrams are viewed from the front/rear direction along which the trailer truck travels.

The configuration of the inclination angle calculation device 100 illustrated in FIGS. 3, 4 and 5 are simplified or abbreviated so that the method of deriving the inclination angle of the container cargo vehicle during travel is better understood.

As shown in FIG. 3, the container 11, when placed on the container chassis 12, is supported by the buffer elastic force (for example, air pressure and spring force) of suspensions 205 (suspension devices (see FIG. 4)) disposed in the tractor 10 and the container chassis 12, and is in a neutral position at a constant level of height from a road surface 204. If, in this condition, the trailer truck 50 travels, its tires will keep "treading" on irregularities of the road surface 204, and, as a result, random external disturbances will be transmitted via the suspensions 205 to the vehicle body (the container 11) of the trailer truck 50. By such external disturbance, the trailer truck 50 oscillates (natural oscillation) based upon the motion having a characteristic period (frequency) dependent on the elastic force of the suspensions 205, the total weight of the container cargo vehicle, and the location of the center of gravity thereof. This motion is detected by the motion detector 14 as reciprocation motion, in the up/down direction, of the center of gravity W of the container cargo vehicle, and as simple pendulum motion in the left/right direction (horizontal direction), of the center of gravity W of the container cargo vehicle.

The suspension 205 in this specification refers to a member that can buffer vibrations of the vehicle body of the trailer truck 50 generated on the road surface 204, and includes, for example, a tire filled with the air and disposed at the ends of the axle in addition to a spring bumper coupled to the axle.

The former reciprocation motion corresponds to a behavior that is called the "pitching" of the tractor 10. When the container cargo vehicle reciprocates in the up/down (vertical) direction, the coupler 13, by which the tractor 10 and the container chassis 12 are coupled together, is pushed vertically. Since the position of the coupler 13 resides behind the tractor 10, the front section of the tractor 10 conversely sinks and floats by the coupler 13 being pushed vertically. This phenomenon is the pitching of the tractor 10. That is to say, the reciprocation motion in the vertical direction (vertical reciprocation motion), of the container cargo vehicle is transmitted through the coupler 13 to the tractor 10, thereby causing the tractor 10 to undergo pitching. The motion detector 14 detects this pitching.

In addition, the latter simple pendulum motion corresponds to a behavior that is called the "rolling" of the trailer truck 50. The motion detector 14 detects this rolling.

In the trailer truck 50, usually, each of the front, rear, right, and left axles is provided with a respective suspension 205; however, from the fact that behaviours of vertical reciprocation motion and horizontal simple pendulum motion occur at the same time, it can be considered reasonable that, in taking account into the dynamic elastic coefficient (spring constant), the analysis of the behaviours is conducted by simply assuming that a single elastic body (spring) is mounted on each of the right and left axles.

Accordingly, when the center of gravity W of the container cargo vehicle is designated as a mass point, the position of the center of gravity W of the container cargo vehicle in the cross-section surface perpendicular to the front/rear direction (travel direction) of the container 11 can be formulated in relation to the inclination angle of the container cargo vehicle during travel as illustrated below.

The method of the formulation of the following expressions 1 to 9 follows the method described in Patent Literature WO2008/062867 pamphlet that has been filed by the applicant of this application.

First, the center of gravity W of the container cargo vehicle is designated as a mass point, and the cycle T' (the cycle corresponding to the pitching cycle of the tractor 10) of the vertical reciprocation motion of the center of gravity W of the container cargo vehicle is formulated.

As illustrated in FIG. 3, if it is thought that there are elastic forces of two elastic bodies at right and left sides of the vehicle, then the characteristic period of the reciprocation motion of the container cargo vehicle is expressed by the following expression.

$$T' = 2\pi \sqrt{\frac{m}{2k}}$$

In this expression, T' is the period of the vertical reciprocation motion of the center of gravity W of the container cargo vehicle. k is the elastic coefficient (spring constant) of one of the right and left suspensions 205. m is the weight of the container cargo vehicle, and n is a circle ratio (pi).

Next, the period T of the horizontal simple pendulum motion of the center of gravity W of the container cargo vehicle (the period corresponding to the rolling period of the trailer truck 50) is expressed in a formula where the center of gravity W of the container cargo vehicle is a mass point.

As shown in FIG. 4, since the rolling of the container cargo vehicle is the horizontal simple pendulum motion of the center of gravity W of the container cargo vehicle in which an axle center 500 (the point of intersection of a vertical central line 201 and an axle position line 202 as shown in FIG. 4) is a point of support, the following expression is obtained from the balance of rotational moment in the tangential direction of a rolling circle during rolling of the container cargo vehicle.

$$Lf = -kx\frac{b}{2} + mgl\sin\theta + mgs\cos\theta - kx\frac{b}{2}$$
$$= -kxb + mgl\sin\theta + mgs\cos\theta$$

In this expression, f is the force that is imparted in the tangential direction of the rolling circle (rotating circle) to the center of gravity W of the container cargo vehicle. θ is the rolling angle. L is the length from the axle center 500 to the center of gravity W of the container cargo vehicle. b is the length of a portion that supports the load of the container 11, and is the constant established for each container 11. l is the vertical length from the axle to the center of gravity W of the container cargo vehicle, and is the value that represents the vertical location of the center of gravity W of the container cargo vehicle, in the cross-section surface perpendicular to the front/rear direction of the container 11, as shown in FIG. 1B. s is the horizontal length from the axle center 500 to the center of gravity W of the container cargo vehicle, and is the value that represents the horizontal location of the center of gravity W of the container cargo vehicle, in the cross-section surface perpendicular to the front/rear direction of the container 11, as shown in FIG. 1B. x is the amount of displacement of each of the right and left suspensions. g is gravitational acceleration.

That is to say, if l and s are found here, this makes it possible to derive the center of gravity W of the container cargo vehicle, in the cross-section surface perpendicular to the front/rear direction (travel direction) of the container 11.

Here, since x=(b/2) sin θ, then the aforesaid rotational moment's balance expression can be represented as follows by expression (1).

$$Lf = -k\frac{b^2}{2}\sin\theta + mgl\sin\theta + mgs\cos\theta \quad (1)$$
$$= -mg\left(\frac{kb^2}{2mg}\sin\theta - l\sin\theta - s\cos\theta\right)$$
$$= -mg\left\{\left(\frac{kb^2}{2mg} - l\right)\sin\theta - s\cos\theta\right\}$$

In addition, expression (1) is expanded as given in expression (2) by the composition of trigonometric functions in parenthesis. In expression (2), the angle of the sine function (θ+α) obtained by the trigonometric function composition is represented as the rolling angle θ'.

$$Lf = -mg\sqrt{\left(\frac{kb^2}{2mg} - l\right)^2 + (-s)^2} \sin\theta' \quad (2)$$
$$\tan\alpha = \frac{-s}{\frac{kb^2}{2mg} - l}$$
$$\therefore f = -\frac{mg}{L}\sqrt{\left(\frac{kb^2}{2mg} - l\right)^2 + (-s)^2} \sin\theta'$$

If the horizontal location of the center of gravity W of the container cargo vehicle resides on the vertical central line 201, then the central angle α of the rolling (simple pendulum motion) of the center of gravity W becomes zero. In the present specification, the central angle α indicates the angle formed by the vertical central line 201 and a rolling central line 206, as shown in FIG. 4.

If the aforesaid location is deviated either rightward or leftward (that is, s≠0), then the central angle α of the rolling has a constant value other than zero. If, in this condition, the trailer truck 50 stops, it tilts and neutralizes while the central angle α is maintained. Therefore, by replacing θ in expression (1) with the central angle α of the rolling of the center of gravity W, the following expression (3) is established on the assumption of either the case where the center of gravity W passes through the center of the rolling or the case where the trailer truck 50 stops.

$$Lf = 0 \quad (3)$$

$$0 = \left(\frac{kb^2}{2mg} - l\right)\sin\alpha - s\cos\alpha$$

$$\therefore s = \left(\frac{kb^2}{2mg} - l\right)\tan\alpha$$

As described above, α corresponds to the inclination angle of the container cargo vehicle during travel which is derived by the inclination angle calculation device 100 of the embodiment. Accordingly, hereinafter, the central angle α of the rolling of the center of gravity W of the container cargo vehicle will be sometimes referred to as the inclination angle α of the container cargo vehicle during travel.

Substitution of expression (3) in expression (2) and reorganization thereof provides the following expression.

$$f = -\frac{mg}{L}\sqrt{\left(\frac{kb^2}{2mg} - l\right)^2 + \left\{\left(\frac{kb^2}{2mg} - l\right)\tan\alpha\right\}^2}\sin\theta'$$

$$= -\frac{mg}{L}\left(\frac{kb^2}{2mg} - l\right)\sqrt{1 + \tan^2\alpha}\sin\theta'$$

$$= -\frac{mg}{L}\left(\frac{kb^2}{2mg} - l\right)\sqrt{\frac{\cos^2\alpha + \sin^2\alpha}{\cos^2\alpha}}\sin\theta'$$

$$= -\frac{mg}{L}\left(\frac{kb^2}{2mg} - l\right)\frac{1}{\cos\alpha}\sin\theta'$$

$$= -\frac{1}{L\cos\alpha}\left(\frac{kb^2}{2} - mgl\right)\sin\theta'$$

Actually, it is assumed that the aforesaid rolling angle θ' is a very small value of a few of degrees of angle at most. Therefore, f in the expression can be written in the following expression from the characteristics of the trigonometric function when θ' has a low enough value (that is, from the relationship of sin θ'≈θ').

$$\therefore f = -\frac{1}{L\cos\alpha}\left(\frac{kb^2}{2} - mgl\right)\theta'$$

This expression form, since it is equivalent to the equation of the circulation motion of a pendulum where L is a radius, is rewritten as follows.

$$mL\frac{d^2\theta'}{dt^2} = -\frac{1}{L\cos\alpha}\left(\frac{kb^2}{2} - mgl\right)\theta'$$

$$\frac{d^2\theta'}{dt^2} = -\frac{1}{L^2\cos\alpha}\left(\frac{kb^2}{2m} - gl\right)\theta'$$

Here, if the angular frequency of θ' is ω, it follows that:

$$\frac{d^2\theta'}{dt^2} = -\omega^2\theta'$$

$$\therefore \omega = \frac{1}{L\sqrt{\cos\alpha}}\sqrt{\frac{kb^2}{2m} - gl}$$

In addition, the rolling period of the trailer truck 50 is T. Since T=2π/ω, the following rewriting is obtained.

$$T = \frac{2\pi}{\frac{1}{L\sqrt{\cos\alpha}}\sqrt{\frac{kb^2}{2m} - gl}}$$

And, since $L=\sqrt{(l^2+s^2)}$, the following expression is finally obtained for the rolling period T.

$$\therefore T = \frac{2\pi\sqrt{(l^2+s^2)\cos\alpha}}{\sqrt{\frac{kb^2}{2m} - gl}}$$

In this way, T' (the period of the vertical reciprocation motion of the center of gravity W of the container cargo vehicle) and T (the period of the horizontal simple pendulum motion of the center of gravity W of the container cargo vehicle) are derived.

Incidentally, the angular velocity detected by the motion detector 14 (the angular velocity sensor 14a) is generally the angular frequency (hereinafter abbreviated as the "frequency") that corresponds to the angle/time, and this frequency is represented by the reciprocal of the period (1/period). Therefore, if the pitching frequency of the tractor 10 that corresponds to T' (the period of the vertical reciprocation motion of the center of gravity W) is denoted as v' and, in addition, the rolling frequency thereof that corresponds to T (the period of the horizontal simple pendulum motion of the center of gravity W) is denoted as v, then the aforesaid expressions can be reorganized to the following expressions, respectively.

$$v' = \frac{1}{T'} = \frac{1}{2\pi}\sqrt{\frac{2k}{m}} \quad (4)$$

$$v = \frac{1}{T} = \frac{\sqrt{\frac{kb^2}{2m} - gl}}{2\pi\sqrt{(l^2+s^2)\cos\alpha}} \quad (5)$$

Here, as can be understood from comparison between expressions (3), (4), and (5), if the frequency v and the frequency v' are known values (in other words, in the case where the arithmetic unit 15 succeeds in specifying these values, v and v' with the aid of the motion detector 14), the number of unknown values is three, namely, l, s, and α.

Accordingly, the numerical values l and s representing the position of the center of gravity W of the container cargo vehicle in a cross-section surface perpendicular to the front/rear direction (travel direction) of the container 11 in relation to the inclination angle α of the container cargo vehicle during travel are formulated as follows. Thus, expressions (4) and (5) are developed to expressions (6) and (7), respectively.

$$\frac{k}{m} = 2\pi^2 v'^2 \tag{6}$$

$$2\pi v \sqrt{(l^2 + s^2)\cos\alpha} = \sqrt{\frac{kb^2}{2m} - gl} \tag{7}$$

$$4\pi^2 v^2 (l^2 + s^2)\cos\alpha = \frac{kb^2}{2m} - gl$$

Substitution of expression (6) in expression (7) provides expression (8).

$$4\pi^2 v^2 (l^2 + s^2)\cos\alpha = b^2 \pi^2 v'^2 - gl \tag{8}$$

$$\therefore l^2 + s^2 = \frac{b^2 \pi^2 v'^2 - gl}{4\pi^2 v^2 \cos\alpha}$$

Similarly, substitution of expression (6) in expression (3) provides expression (9).

$$\therefore s = \left(\frac{\pi^2 v'^2 b^2}{g} - l\right)\tan\alpha \tag{9}$$

Next, the method of deriving the inclination angle α of the container cargo vehicle during travel, which is the feature of the embodiment, will be described in details below with reference to the drawings.

In the conceptual diagram of FIG. 4 showing the motion of the container cargo vehicle, the angle Φ is defined by the two numerical values l and s that represent the position of the center of gravity W, as an important angle to determine the inclination angle α of the container cargo vehicle during travel, and is expressed as follows.

$$\tan\phi = \frac{s}{l} \tag{10}$$

The angle Φ becomes zero if the center of gravity W is present on the vertical center line 201 (that is, if s=0). In this state, α also becomes zero, of course.

Supposing that the rolling frequency v and the pitching frequency v' are constant, l is calculated from expression (8) by appropriately setting predetermined value s. Accordingly, it is understood that neutral and virtual gravity center W' shifts while drawing the trajectory of virtual curve line 400 illustrated by the thick virtual line (two-dotted line) in FIG. 5A.

Figure 5A:
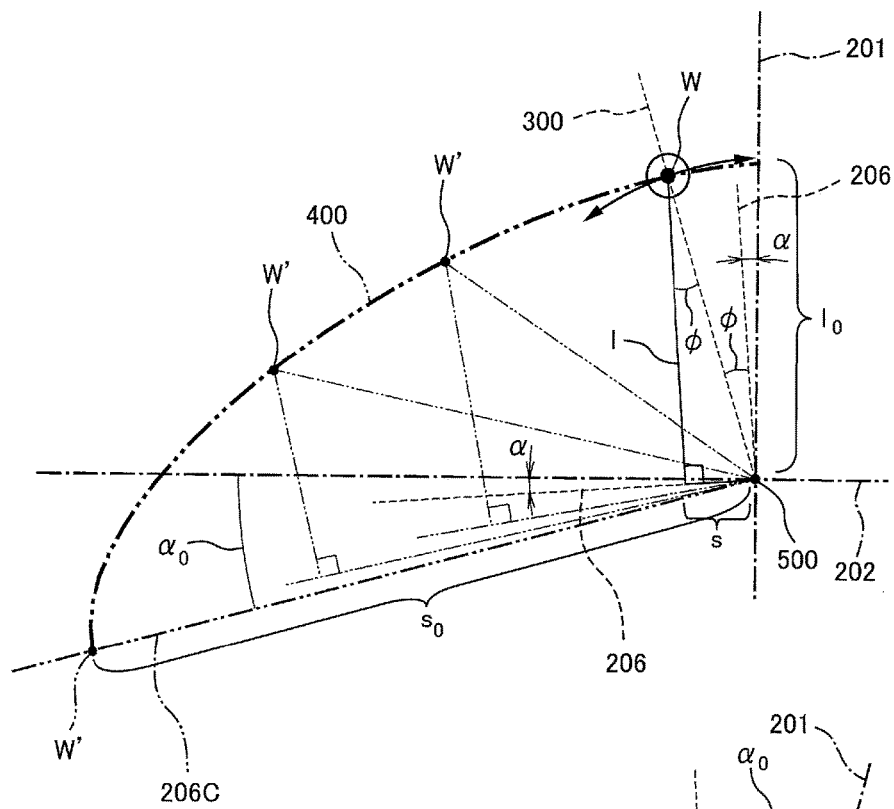
FIG. 5 is a schematic diagram that describes the method of deriving the inclination angle of the container cargo vehicle during travel by means of the inclination angle calculation device according to the embodiment of the invention.

As illustrated in FIG. 5A, Φ increases as s increases, while l decreases as s increases. At the final stage of s=$s_0$, which is the maximum value of s, Φ ends up with 90 degrees and l ends up with zero. At this time, the virtual straight line 206C passing through the virtual gravity center W' and the axle center 500 (the original point of oscillation of the center of gravity W) is specified, and an angle formed between the virtual straight line 206C and the axle position line 202 is set as $\alpha_0$.

Conversely, Φ decreases as s decreases, while l increases as s decreases. At the final stage of l=$l_0$, which is the maximum value of l, Φ ends up with 0 degree, α ends up with 0 degree, and s ends up with zero.

Thus, the inventor of the present invention believed that the virtual curve line 400 forms a part of the ellipse that is shaped with a gravity center position straight line 300 passing through the axis center 500 and the center of gravity W as a minor axis and the virtual straight line 206C as a major axis. The inventor also believed that the ellipse has a deviated phase of $\alpha_0$.

In fact, if v and v' become known values by the motion detector 14, l, s and α of the container cargo vehicle are defined as constant values, and these l, s and α do not vary. However, $s_0$, $\alpha_0$ and $l_0$, are defined as constant values by expressions (8) and (9) and based on the combination of v and v'.

Accordingly, firstly, the method of deriving these numeral values $s_0$, $\alpha_0$ and $l_0$, will be described.

In expression (8), if s=0, then α is 0 degree and l is $l_0$. b is a constant value (which is the length of a portion that supports the container 11).

Therefore, in expression (8), if s=0 and v and v' become known values by the motion detector 14, then $l_0$ can be defined using the following expression (11).

$$l_0^2 + \frac{g}{4\pi^2 v^2}l_0 - \frac{v'^2 b^2}{4v^2} = 0 \tag{11}$$

Furthermore, in expressions (8) and (9), if l=0, simultaneous equations can be obtained in which α=$\alpha_0$, and s=$s_0$. The solution of the simultaneous equations, in which l=0, can provide expression (12), and $\alpha_0$ can be defined using the expression (12).

In expression (12), b is the length of a portion that supports the load of the container 11, π is the circle ratio, and g is the gravitational acceleration, all of which are constant values.

$$\cos^2\alpha_0 + \frac{g^2}{4\pi^2 v^2 v'^2 b^2}\cos\alpha_0 - 1 = 0 \tag{12}$$

Substitution of $\alpha_0$ derived by expression (12) in expression (8) or (9), in which l=0, $s_0$ can also be defined. Accordingly, it is understood that $s_0$, $\alpha_0$ and $l_0$ can be calculated by inputting specific numerical values to b, v and v'.

The technical meaning of the angle $\alpha_0$ formed between the virtual straight line 206C and the axle position line 202 will be studied below.

Figure 5B:
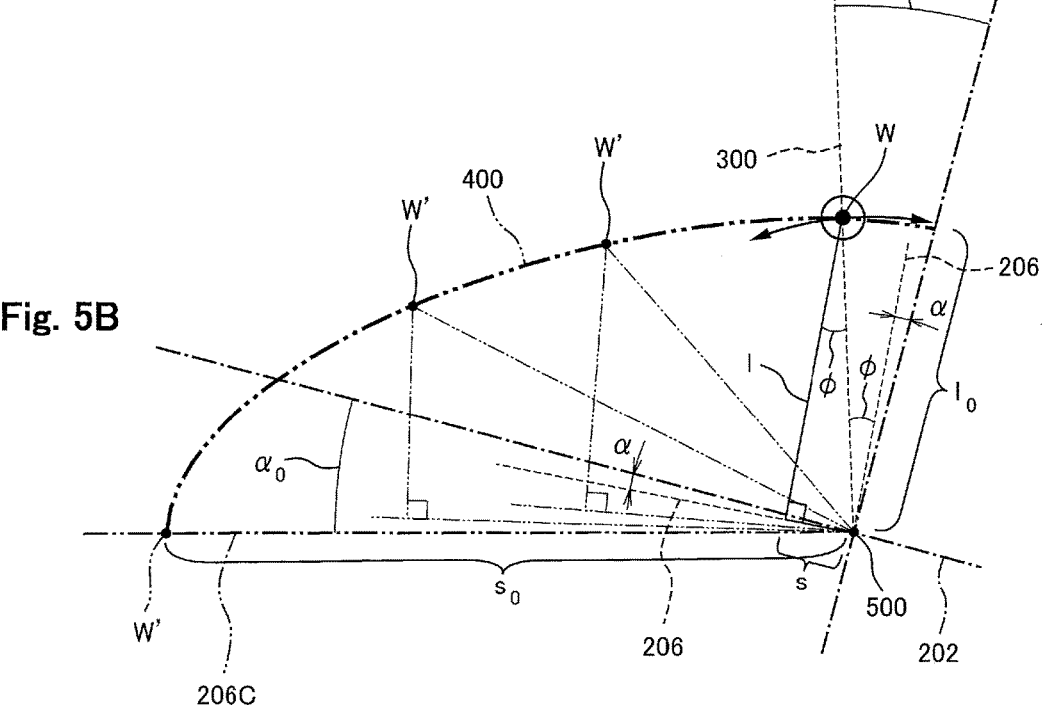

Rotating the virtual curve line 400 shown in FIG. 5A about the axle center 500 such that the virtual straight line 206C is oriented in the horizontal direction can provide the understanding of the technical meaning of $\alpha_0$ (see FIG. 5B).

As described above, if the virtual curve line 400 is a part of the ellipse provided with the gravity center position straight line 300 as a minor axis and the virtual straight line 206C as a major axis, the gravity center position straight line 300 is oriented in the vertical direction as shown in FIG. 5B. From this, it is understood that $\alpha_0$ is the state variable representing the sum of Φ and α corresponding to the position of the original center of gravity W. In other words, the gravity center position straight line 300 is rotated from the vertical axis (vertical center line 201) for a degree calculated from expression (13) below.

$$\alpha_0 = \phi + \alpha \quad (13)$$

On the above assumption, the expression that represents the inclination angle α of the container cargo vehicle during travel can be converted as below.

First, the both sides in expressions (8) and (9) are reorganized using l, and thereby the both expressions can be reorganized as expressions (8') and (9') in which Φ is included.

$$l^2(1 + \tan^2\phi) = \frac{b^2\pi^2 v'^2 - gl}{4\pi^2 v^2 \cos\alpha} \quad (8')$$

$$\tan\phi = \left(\frac{\pi^2 v'^2 b^2}{gl} - 1\right)\tan\alpha \quad (9')$$

Then, expression (13) is modified as Φ=α₀−α, Φ is substituted in expressions (8') and (9') and l is eliminated from the both sides of the expressions (the detailed development of the expressions is omitted). As a result, expression (14) below is finally obtained that represents the inclination angle α.

$$\frac{4\pi^4 v^2 v'^2 b^2}{g^2}\sin^2\alpha - \cos\alpha\sin^2(\alpha_0 - \alpha) - \sin\alpha\sin(\alpha_0 - \alpha)\cos(\alpha_0 - \alpha) = 0 \quad (14)$$

In expression (14), b is the length of a portion that supports the load of the container 11, π is the circle ratio, and g is the gravitational acceleration, all of which are constant values. In addition, v is the rolling frequency of the tractor 10 and v' is the pitching frequency of the tractor 10, which can be obtained on the basis of the output data from the motion detector 14. Moreover, α₀ can be calculated by placing specific numeral values to b, v and v' using expression (12).

Accordingly, the only unknown numeral in expression (14) is α, and thus a can be theoretically calculated using expression (14).

As described above, the inclination angle calculation device 100 according to the embodiment can easily and highly accurately provide the inclination angle α of the container cargo vehicle during travel on the basis of the mass system dynamical theory, without using the integration of angular velocity.

Next, an exemplary calculation operation of the inclination angle α of the container cargo vehicle during travel conducted by the inclination angle calculation device 100 according to the embodiment will be described below with reference to the drawings.

Figure 6:
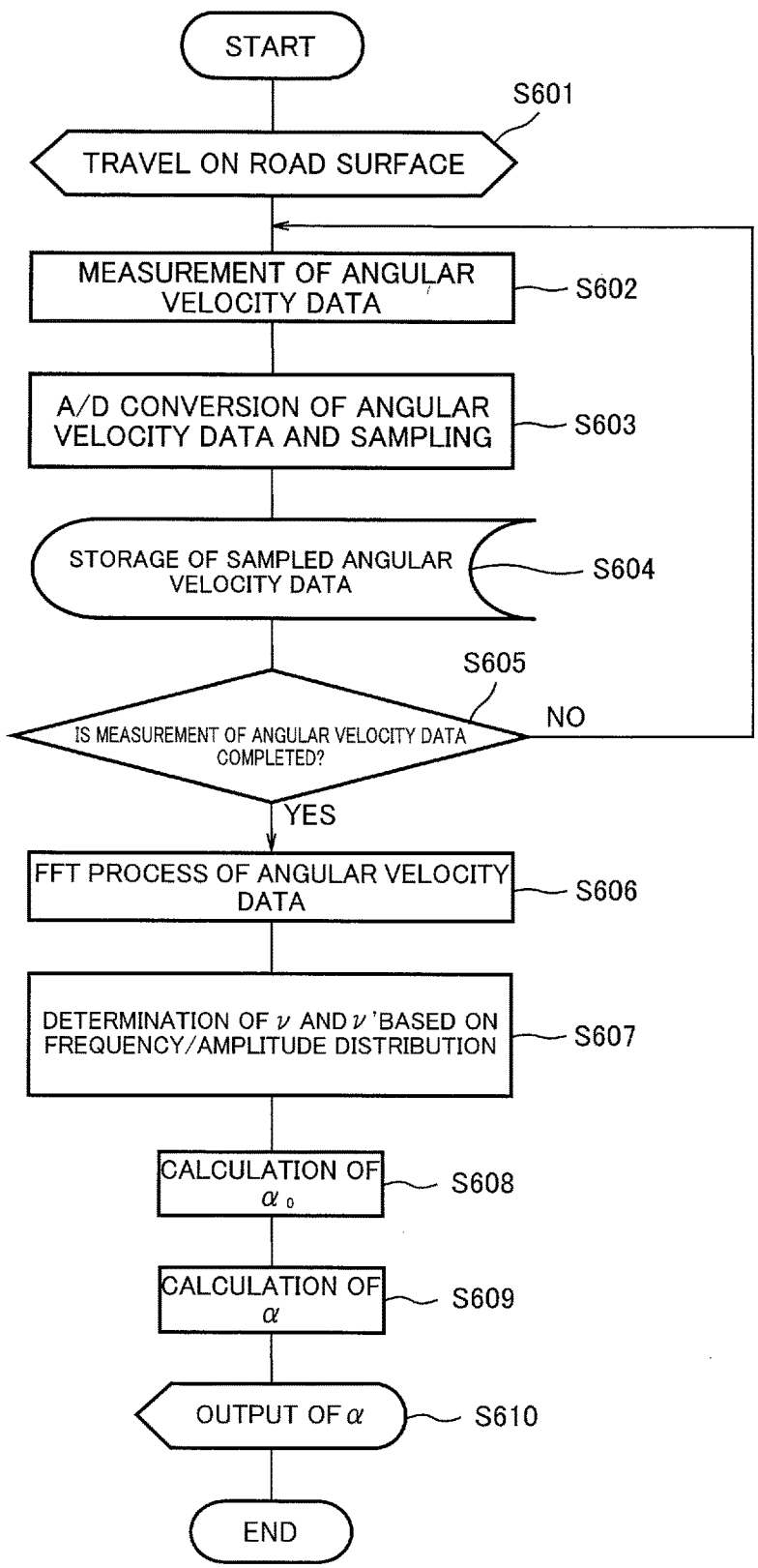
FIG. 6 is a flowchart showing an example of a routine for the calculation of the inclination angle of the container cargo vehicle during travel by means of the inclination angle calculation device according to the embodiment of the invention.

FIG. 6 is a flowchart showing an example of a calculation routine of the inclination angle of the container cargo vehicle during travel conducted by the inclination angle calculation device of the embodiment of the present invention.

When a power switch of the operation setting/display part 15c of the arithmetic unit 15 is pressed, a plurality of menus are displayed on a display screen (not shown) of the operation setting/display part 15c. By operating a selected button on the operation setting/display part 15c, the calculation operation of the inclination angle α as described below is initiated, anytime during the travel of the trailer truck 50.

In the execution of the calculation operation, the operation instructions that an operator (e.g., a driver or a passenger of the tractor 10) needs to follow are message-displayed on the display screen of the operation setting/display part 15c. When the calculation operation of the inclination angle α is selected, the arithmetic part 15a of the arithmetic unit 15 reads out the program for calculation of the inclination angle and prestored constants from the storage part 15b, and this program is executed while controlling the arithmetic part 15a, the storage part 15b and the operation setting/display part 15c.

The constants include, for example, the length b of a portion that supports the load of the container 11, the gravitational acceleration g, and the circle ratio π.

For a forty-feet marine container of standard specification, the length b of a portion that supports the load of the container 11, is often designated as a standard value, and thus it is advantageous to store the constant b in the storage part 15, because the confirmation and inputting operations of the constants can be omitted. Instead of this, however, the operator can input the constant b using the operation setting/display part 15c of the arithmetic unit 15 each time the inclination angle α is calculated.

In the calculation, as a preparation operation of the calculation of the inclination angle α of the container cargo vehicle, the tractor 10 which is towing the container 11 loading cargos and the container chassis 12 is traveled on a road surface 204 (step S601). Thereupon, random external disturbances due to irregularities of the road surface 204 are transmitted to the vehicle body (container 11) of the trailer truck 50 through the suspensions 205.

Accordingly, the motion detector 14 can detect the motions in the self-weight direction and the width direction of the container cargo vehicle.

When the operation of calculating the inclination angle α is initiated by the manipulation of buttons of the operation setting/display part 15c conducted by the operator (for example, the driver of the tractor 10 or the passenger), the angular velocity data of pitching corresponding to the vertical reciprocation motion of the center of gravity W and rolling (horizontal simple pendulum motion) of the center of gravity W are measured as analog signals by means of the angular velocity sensor 14a of the motion detector 14 (step S602). And, the analog angular velocity data are sampled, by the arithmetic unit 15 (arithmetic part 15a), as digital signals which have passed through the A/D converter 14b of the motion detector 14, for every predetermined sampling time prestored in the storage part 15b (step S603). The digital angular velocity data thus sampled are stored in the storage part 15b, together with time-series data (step S604).

Next, the arithmetic part 15a determines whether or not to terminate the measurement of angular velocity data by the angular velocity sensor 14a (step S605). If the arithmetic part 15a determines that measurement of angular velocity data may be terminated ("Yes" in step S605), then the routine moves to subsequent processing steps (step S606 and subsequent steps). On the other hand, if the arithmetic part 15a determines that the measurement of the angular velocity data should not be terminated ("No" in step S6605), then the processing of the aforesaid steps S602-604 is continued.

The determination as to whether or not the measurement may be terminated may be made, based upon a predetermined measurement time that is derived from a required total number of samples prestored in the storage part 15b and the aforesaid sampling time. For example, if the number of samples, at which the statistical error of sampling becomes considerably diminished, is 4096 (since FFT is an analysis intended for the number of integer multipliers of 2, $2^{12}$ is shown here as an example number of samples) and, if the sampling time is 0.002 S (0.002 second), then the minimum required measurement time is: 4096×0.002 S=8 S. Therefore, in this case, the arithmetic part 15a determines that the measurement of angular velocity data may be terminated after an elapse of 8 seconds or more since the time when the angular velocity sensor 14a started measuring the angular velocity data.

Additionally, as a substitute for such a determination operation, the arithmetic part 15a may determine whether or not to terminate the measurement of angular velocity data, based on the presence or absence of the manipulation of a measurement terminating button of the operation setting/display part 15c by the operator.

The measurement of angular velocity data conducted in such a short period of time serves as a basis for the elimination of numerical values k and m in the formulation of the simultaneous equations, based on the precondition that k (the elastic coefficient of the suspension 205) and m (the weight of the container cargo vehicle) are invariable during the period of the measurement of the angular velocity data.

To sum up, if the time taken for the measurement of the angular velocity data is long due to the use of the gyro including the conventional error correction algorithm (such as Kalman filter), this may sometimes cause a case where the precondition that the numerical values k and m are invariable during the period of the measurement of the angular velocity data may be no longer satisfied, due to substantial changes in external disturbance such as the state of irregularities of the road surface and the condition of weather (e.g., wind velocity).

As described above, the inclination angle calculation device 100 of the embodiment has an advantageous effect, as compared to the conventional art that uses the gyro, with respect to rapid change of the external disturbances. Specifically, the use of the gyro requires considerable time in the execution of the error correction algorithm, and this limits the sampling time to about 0.01 second, for example. In contrast, the inclination angle calculation device 100 of the embodiment can omit the error correction algorithm. Thus, the sampling time (0.002 second in this embodiment) can be reduced to the level of the minimum sampling time of the sensor element (about 0.001 second), and thereby the time taken for the measurement of the angular velocity data can be advantageously and largely reduced.

Following the completion of the measurement of the angular velocity data by the angular velocity sensor 14, the arithmetic part 15a applies fast Fourier transform (FFT) to the time-series angular velocity data stored in the storage part 15b to convert the angular velocity data to the data of amplitude corresponding to a frequency (step S606).

Thereby, the rolling frequency v is determined using the distribution showing the correlation between the rolling frequency and the rolling amplitude (hereinafter abbreviated as "rolling frequency/amplitude distribution") (step S607). Furthermore, the pitching frequency v' is determined using the distribution showing the correlation between the pitching frequency and the pitching amplitude (herein after abbreviated as "pitching frequency/amplitude distribution") (step S607).

Figure 7:
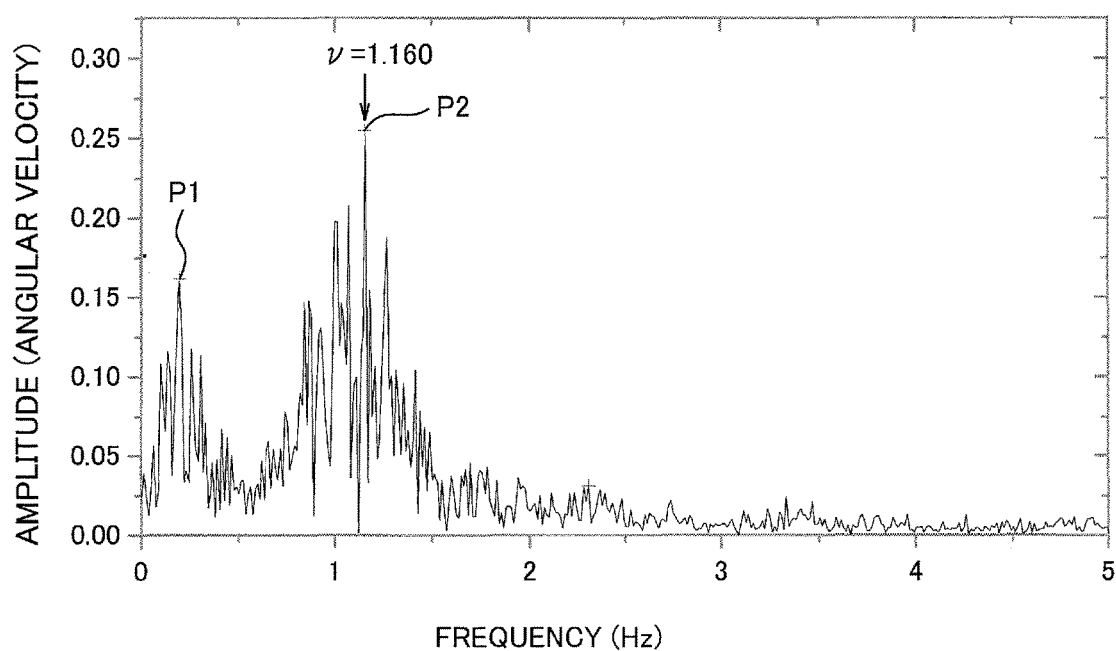
FIG. 7 is a diagram showing an example of rolling frequency/amplitude distribution, while a horizontal axis represents a frequency (Hz) and a vertical axis represents an amplitude (angular velocity).

Specifically, in the rolling frequency/amplitude distribution as exemplified, for example, in FIG. 7, two frequencies can be determined that correspond to the peak amplitudes (tops) of the rolling viewed from the lower value of frequencies of the rolling.

The peak amplitudes include a peak amplitude P1 derived from the coupler 13 that is used as a coupling member coupling the front part of the container chassis 12 and the tractor 10, and a peak amplitude P2 derived from a rear cross beam (not shown) that is positioned on the rear part of the container chassis 12.

The correlation between the peak amplitudes P1, P2 and the frequencies corresponding to those amplitudes P1, P2 can be understood with reference to expression (5). Therefore, the detailed description of the correlation thereof is omitted.

In the inclination angle calculation device 100 of the embodiment, any frequencies corresponding to the peak amplitudes P1, P2 can be selected as the rolling frequency v. In such a selection, however, the length b of a portion that supports the load of the container 11 needs to correspond to the selected rolling frequency v.

In this embodiment, the frequency (1.16 Hz) corresponding to the peak amplitude P2 is selected as an example of the rolling frequency v, as shown in FIG. 7. In this selection, the width dimension of a portion of the rear cross beam that is located at a rear part of the container chassis 12 to support the load of the container 11 needs to be used for the length b in expressions (12) and (14) below.

In other words, when a predetermined frequency is to be obtained in correspondence with the peak amplitude of the rolling that is derived from a predetermined width dimension of the container cargo vehicle, the width dimension and the frequency need to be used for the length b and the rolling frequency v in the expressions (12), (14).

Figure 8:
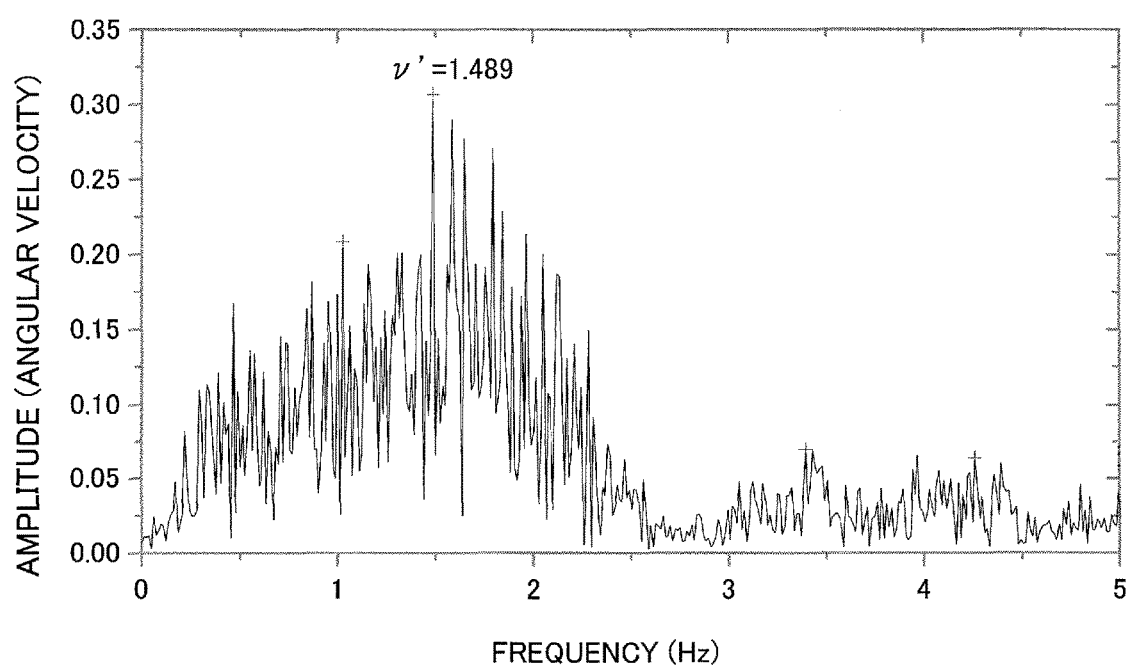
FIG. 8 is a diagram showing an example of pitching frequency/amplitude distribution, while a horizontal axis represents a frequency (Hz) and a vertical axis represents an amplitude (angular velocity).

In the pitching frequency/amplitude distribution as exemplified, for example, in FIG. 8, the frequency (1.489 Hz) corresponding to the maximum pitching amplitude can be selected as the pitching frequency v'.

Then, the arithmetic part 15a reads out the constant b prestored in the storage part 15b, and calculates $\alpha_0$ from expression (12) below using the frequencies v, v' obtained at step S607 (step S608).

$$\cos^2\alpha_0 + \frac{g^2}{4\pi^2 v^2 v'^2 b^2}\cos\alpha_0 - 1 = 0 \tag{12}$$

Next, the arithmetic part 15a reads out the constant b prestored in the storage part 15b, and calculates the inclination angle $\alpha$ of the container cargo vehicle during travel from expression (14) below using the angle $\alpha_0$ obtained at step S608 (step S609).

$$\frac{4\pi^4 v^2 v'^2 b^2}{g^2}\sin^2\alpha - \cos\alpha\sin^2(\alpha_0 - \alpha) - \sin\alpha\sin(\alpha_0 - \alpha)\cos(\alpha_0 - \alpha) = 0 \tag{14}$$

Then, the arithmetic part 15a outputs (displays) the inclination angle $\alpha$ obtained at step S609 onto the display screen of the operation setting/display part 15c (step S610), and concludes the calculation routine of the inclination angle $\alpha$.

As described above, the inclination angle calculation device 100 according to the embodiment includes the motion detector 14 that detects the motions of the container cargo vehicle during travel in the self-weight direction and the width direction of the cross-section surface perpendicular to the travel direction of the container cargo vehicle, and the arithmetic unit 15.

The arithmetic unit 15 of the inclination angle calculation device 100 can calculate the inclination angle $\alpha$ of the container cargo vehicle during travel, in the above stated cross-section surface, using the frequency of the motion in the self-weight direction of the container cargo vehicle (which frequency corresponds to the pitching frequency v' of the tractor 10 in the inclination angle calculation device 100 of the embodiment) and the rolling frequency v in the width direction of the container cargo vehicle, without using the integration of the angular velocity.

Accordingly, the inclination angle calculation device 100 of the embodiment does not need to add such various functions as an angular velocity integration function and a filtering function to the motion detector 14, and thereby the motion detector 14 can be produced at extremely low cost. In addition, the calculated inclination angles α correspond to frequencies in one-to-one correspondence. Thus, random errors due to the integration, filtering and statistical algorithm can be prevented, and as a result, the device 100 can achieve high accuracy.

The inclination angle α of the container cargo vehicle during travel serves as valuable data that directly reflects the degree of biased loading of a container cargo whose loading condition is unknown. Because of this, if the inclination angle α is calculated easily and highly accurately, it is advantageous to predict a collapse/falling of cargo piles at a time the door of the container is opened, or unstable traveling of the trailer truck 50 (e.g., unstable traveling because of a curved road or malfunction of suspensions).

Especially, the inclination angle of the container cargo vehicle during travel (herein after referred to as "inclination angle of this technology") derived by the inclination angle calculation device 100 according to the embodiment is advantageous for the current condition of the transportation business of containers 11 as described below.

In practical application of the inclination angle calculation device 100, it is easily understood that the motion detector 14 should be installed at the tractor 10 side since a large number of container chassis are used in the container transportation business. If the inclination angle is calculated by the angular velocity integration (herein after referred to as "inclination angle of angular velocity integration method") based on high performance gyro (including Kalman filter algorithm), the inclination angle resulting from the angular velocity integration may probably contain errors. This is because air suspensions of the tractor 10 act in the direction to cancel the inclination of the container cargo vehicle, and thus the inclination of the tractor 10 tends to become smaller than the inclination of the container cargo vehicle.

In contrast, this technology of the disclosure calculates the inclination angle on the basis of the frequency of the specified angular velocity of the container cargo vehicle, and thus can solve the problem described above.

Accordingly, the inclination angle of this technology can accurately reflect the inclination angle of the container cargo vehicle, as compared to the inclination angle derived by the angular velocity integration method. The following validation calculation will evidence this deduction (see Example below).

First Modified Example

The inclination angle calculation device 100 according to the embodiment is used to calculate the inclination angle α of the container cargo vehicle during travel. However, the inclination angle calculation device 100 is not limited to this and can be applied to others.

As described above, the technology disclosed in this specification can be applied to various transportation devices including trucks, buses, passenger cars, railway vehicles, ships and airplanes (during landing and takeoff, for example) as well as the container transportation vehicle (container cargo vehicle).

In the present modified example, an exemplary configuration of the inclination angle calculation device used to calculate the inclination angle of a passenger car will be briefly described below (drawings thereof are omitted).

In calculation of the inclination angle of a rectangular passenger car that has a relatively short length in the front/rear direction, it is theoretically consistent to use a motion detector including a combination of an angular velocity sensor of the polar coordinate system whose angular velocity sensitive axes are adjusted in the width direction of the passenger car and an acceleration sensor of the linear coordinate system whose acceleration sensitive axes are adjusted in the vertical direction of the passenger car, unlike the motion detector 14 for the trailer truck 50. The motion detector comprised of the angular velocity sensor and the acceleration sensor is directly mounted to the vehicle body of the passenger car, and thereby the motion detector may measure angular velocity data and acceleration data during a passenger car's travel on a road surface for a specified time.

In this measurement, the arithmetic part (arithmetic unit) applies fast Fourier transform (FFT) to time-series angular velocity data and acceleration data stored in the storage part to convert the angular velocity data and the acceleration data to the amplitude data that correspond to respective frequencies of the angular velocity data and the acceleration data.

This results in the rolling frequency/amplitude distribution and the acceleration frequency/amplitude distribution in the vertical direction, which are relevant data about the passenger car.

In the rolling frequency/amplitude distribution in this case, FFT distribution does not show two peak amplitudes like those shown in FIG. 7 and shows one peak amplitude, because of an uniform vehicle width of the passenger car. In the passenger car having substantially the same vehicle width in front/rear direction, the reason why FFT distribution shows one peak amplitude can be understood from expression (5), and thus detailed description thereof is omitted.

Accordingly, the inclination angle α of the passenger car during travel can be calculated, in such a manner that the frequency corresponding to the peak amplitude of the rolling frequency/amplitude distribution is the rolling frequency v in expressions (12), (14), the vehicle width of the passenger car (which is substantially the same in the front/rear direction) is the length b in expressions (12), (14), and the frequency corresponding to the maximum amplitude of the acceleration frequency/amplitude distribution is the frequency v' in expressions (12), (14).

Second Modified Example

In the inclination angle calculation device 100 according to the embodiment, the calculation of the inclination angle α of the container cargo vehicle during travel is exemplified using expression (14) below. However, the method of formulation of the inclination angle α of the inclination angle calculation device illustrated in this specification is not limited to expression (14).

$$\frac{4\pi^4 v^2 v'^2 b^2}{g^2} \sin^2\alpha - \cos\alpha\sin^2(\alpha_0 - \alpha) - \sin\alpha\sin(\alpha_0 - \alpha)\cos(\alpha_0 - \alpha) = 0 \qquad (14)$$

Specifically, the inclination angle α can be calculated by various methods using the frequency v' of the motion in the self-weight direction and the rolling frequency v in the width direction, of the container cargo vehicle during travel (one example of the traveling object).

Although the development of expression in detail is omitted, if the inclination angle α is within a range of a small angle that is generally generated in a practical container cargo vehicle (that is, if tangent α≈≈), the formulation of the inclination angle α other than expression (14) is possible.

Specific example will be described below in the present modified example.

First, α is eliminated from simultaneous equations (8'), (9') below and an expression with only 1 is created.

$$l^2(1+\tan^2\phi) = \frac{b^2\pi^2 v'^2 - gl}{4\pi^2 v^2 \cos\alpha} \quad (8')$$

$$\tan\phi = \left(\frac{\pi^2 v'^2 b^2}{gl} - 1\right)\tan\alpha \quad (9')$$

Then, expression (15) below is obtained.

$$16\pi^4 v^4(1+\tan^2\phi)^2 l^4 - g^2(1+\tan^2\phi)l^2 + 2b^2\pi^2 v'^2 gl - b^4\pi^4 v'^4 = 0 \quad (5)$$

If the inclination angle α is within a range of a small angle, the angle (1) can be assumed to be formulated by expression (16) below from the feature of the significant point in the ellipse of expression (8).

$$\phi \approx \alpha_0 \frac{l_0}{s_0} \quad (16)$$

In expression (16), as described above, $s_0$, $\alpha_0$ and $l_0$ can be calculated by inputting specific numeral values to b, v and v'. Accordingly, the angle Φ can be calculated using expression (16).

Thus, l can be calculated by substituting Φ in expression (15), and the inclination angle α can be calculated by substituting l in expression (9').

Third Modified Example

In the inclination angle calculation device 100 according to the embodiment, an exemplary calculation is described that calculates the inclination angle α of the container cargo vehicle during travel, in the cross-section surface perpendicular to the travel direction of the container cargo vehicle. The inclination angle calculation device 100 described in this specification, however, is not limited to such an application.

For example, the inclination angle α' of the container cargo vehicle during travel can be calculated on the basis of the cross-section surface (specifically, the cross-section surface facing the direction as shown in FIG. 1A) that includes the front/rear direction and the up-down (vertical) direction of the container cargo vehicle (i.e., two directions of the container cargo vehicle orthogonal with each other), using a method similar to the method described in the embodiment.

The deriving method of the inclination angle α' can be easily understood referring to the method described in the aforementioned embodiment, and thus detailed description thereof is omitted.

The calculation of the inclination angle α' can be helpful in predicting overloading of the container cargo vehicle and in preventing a bending phenomenon (jackknife) between the tractor and the container cargo vehicle.

It is known that the jackknife easily takes place when cargos are placed up to a deep end of a container and thus the cargos are unevenly distributed at the front section of the container. Thus, if the uneven distribution of cargos is predicted from the inclination angle α', the jackknife can advantageously be prevented.

Example

The validation calculation below is conducted in order to confirm the validity of the inclination angle of this technology in comparison with the inclination angle of the angular velocity integration method. The input values used in this validation calculation are based on the data obtained by the validation test that was performed using a real vehicle on a public road in Kobe Port Island on Feb. 14, 2007.

In this case, a marine container was loaded with a cargo of about ten tons in a condition slightly biased loading. In this validation calculation, the inclination angle of the angular velocity integration method and the inclination angle of this technology are substituted in expressions (8), (9) to calculate the numeral values l, s that represent the position of the center of gravity in a cross-section surface perpendicular to the travel direction of the container cargo vehicle.

As a result, the position of the center of gravity (which was determined by the numeral values l, s) derived using the inclination angle of the angular velocity integration method was at substantially the center in the left/right direction (width direction) of the container cargo vehicle, whereas the position of the center of gravity (which was determined by the numeral values l, s) derived using the inclination angle of this technology was slightly deviated from the center in the left/right direction (width direction) of the container cargo vehicle.

From the above, in the detection of the position of the center of gravity in the case where the inclination angle of the angular velocity integration method was used, the actions of air suspensions of the tractor 10 could have negatively affected the detection of biased loading of the cargo. In contrast, in the detection of the position of the center of gravity in the case where the inclination angle of this technology was used, slight biased loading of the cargo could be simulated properly.

From the above, the validity of the inclination angle of this technology is confirmed by the validation calculation described above.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications that come within the scope of the appended claims are reserved.

INDUSTRIAL APPLICABILITY

The inclination angle calculation device according to the present invention can easily and highly accurately calculate the inclination angle of α traveling object during travel without using integration of angular velocity.

Accordingly, the present invention can be applied to the calculation of the inclination angle of various types of transportation devices during travel, including container transportation vehicles (container cargo vehicles), trucks, buses, passenger cars, railway vehicles, ships and airplanes (for example, during landing and takeoff).

REFERENCE SIGNS LISTS 10 tractor
11 container
12 container chassis
13 coupler
14 motion detector
14a angular velocity sensor
14b A/D converter
15 arithmetic unit
15a arithmetic part
15b storage part
15c operation setting/display part
50 trailer truck (container transportation vehicle)
100 inclination angle calculation device
201 vertical center line
202 axle position line
204 road surface
205 suspension
206 rolling center line
206C virtual straight line
300 gravity center position straight line
400 virtual curve line
500 axle center

What is claimed is:

1. An inclination angle calculation device comprising:
a motion detector that detects motions of a traveling object during travel, in two directions included in a cross-section surface of the traveling object, the two directions being orthogonal with each other, wherein the traveling object is a trailer truck; and
an arithmetic device that calculates an inclination angle of the traveling object during travel in the cross-section surface using (i) a frequency of the motion in one of the two directions, (ii) a rolling frequency in the other direction of the two directions; and (iii) an angle formed between (a) a virtual straight line passing through a virtual center of gravity and an axle center of the traveling object and (b) an axle position line, to prevent overloading of the trailer truck or prevent a bending phenomenon between a towing vehicle of the trailer truck and a towed vehicle of the trailer truck on a curved road;
wherein the motion detector includes an angular velocity sensor mounted on the traveling object, the angular velocity sensor comprising an angular velocity sensitive axis that is adjustable in the other direction of the two directions.

2. The inclination angle calculation device according to claim 1, wherein the cross-section surface is perpendicular to a travel direction of the traveling object, and one of the two directions is a self-weight direction of the traveling object while the other direction is a width direction of the traveling object.

3. The inclination angle calculation device according to claim 2, wherein when the motion in the self-weight direction corresponds to a vertical reciprocation motion in which the center of gravity of the traveling object is a mass point, the motion in the width direction corresponds to a horizontal simple pendulum motion in which an axle center of the traveling object in the width direction is a support point, and the center of gravity of the traveling object is a mass point,
the arithmetic device converts output data of the motion detector into rolling data that represents a correlation between a frequency and an amplitude of the simple pendulum motion, and obtains a frequency of the simple pendulum motion in correspondence with a peak amplitude of the simple pendulum motion which is derived from a predetermined width dimension of the traveling object on the basis of the rolling data,
further converts the output data of the motion detector into pitching data that represents a correlation between a frequency and an amplitude of the reciprocation motion, and obtains a frequency of the reciprocation motion corresponding to a maximum amplitude of the reciprocation motion on the basis of the pitching data, and
derives a central angle of the simple pendulum motion as the inclination angle using the predetermined width dimension of the traveling object, the obtained frequency of the simple pendulum motion, and the obtained frequency of the reciprocation motion.

4. The inclination angle calculation device according to claim 1, wherein the motions in the two directions are movements due to external disturbances applied to the traveling object during travel on a road surface by irregularities of the road surface.

5. The inclination angle calculation device according claim 1, wherein the angular velocity sensitive axes of the sensor are adjusted in the two directions.

6. The inclination angle calculation device according to claim 3, wherein the arithmetic device calculates the central angle according to an expression showing a relation among the predetermined width dimension of the traveling object, the obtained frequency of the simple pendulum motion, the obtained frequency of the reciprocation motion, and the central angle of the simple pendulum motion.

7. The inclination angle calculation device according to claim 6, wherein when the predetermined width dimension of the traveling object is b, the obtained frequency of the simple pendulum motion is v, the obtained frequency of the reciprocation motion is v', and the central angle of the simple pendulum motion is $\alpha$, the angle formed between the virtual straight line and the axle position line is $\alpha_0$, the expression is represented by a formula:

$$\cos^2\alpha_0 + \frac{g^2}{4\pi^2 v^2 v'^2 b^2}\cos\alpha_0 - 1 = 0$$

$$\frac{4\pi^4 v^2 v'^2 b^2}{g^2}\sin^2\alpha - \cos\alpha\sin^2(\alpha_0 - \alpha) - \sin\alpha\sin(\alpha_0 - \alpha)\cos(\alpha_0 - \alpha) = 0.$$

8. A center-of-gravity detection device into which the inclination angle calculation device according to claim 3 is incorporated, wherein the arithmetic device calculates the location of the center of gravity of the traveling object in the cross-section surface, based on the predetermined width dimension of the traveling object, the obtained frequency of the simple pendulum motion, the obtained frequency of the reciprocation motion, and the central angle of the simple pendulum motion.

9. The inclination angle calculation device of claim 2, wherein the motion detector includes an acceleration sensor mounted on the traveling object, the acceleration sensor comprising an acceleration sensitive axis that is adjustable in the self-weight direction of the traveling object, the angular velocity sensor comprising an angular velocity sensitive axis that is adjustable in the width direction of the traveling object.

10. An inclination angle calculation device comprising:
a motion detector for detecting motions of a traveling object during travel, in two directions included in a cross-section surface of the traveling object, wherein the traveling object is a trailer truck,
wherein the cross-section surface is perpendicular to a travel direction of the traveling object,
wherein a first direction of the two directions is a self-weight direction of the traveling object and a second direction of the two directions is a width direction of the traveling object, the two directions being orthogonal with each other,
wherein when the motion in the self-weight direction corresponds to a vertical reciprocation motion in which a center of gravity of the traveling object is a mass point, the motion in the width direction corresponds to a horizontal simple pendulum motion in which an axle center of the traveling object in the width direction is a support point, and the center of gravity of the traveling object is a mass point; and
an arithmetic device that calculates an inclination angle of the traveling object during travel in the cross-section surface, using a frequency of the motion in one of the two directions and a rolling frequency in the other direction of the two directions, to predict overloading of the trailer truck or prevent a bending phenomenon between a towing vehicle of the trailer truck and a towed vehicle of the trailer truck on a curved road, the arithmetic device adapted to:
convert output data of the motion detector into rolling data that represents a correlation between a frequency and an amplitude of the simple pendulum motion and obtain a frequency of the simple pendulum motion in correspondence with a peak amplitude of the simple pendulum motion which is derived from a predetermined width dimension of the traveling object on the basis of the rolling data,
convert the output data of the motion detector into pitching data that represents a correlation between a frequency and an amplitude of the reciprocation motion and obtain a frequency of the reciprocation motion corresponding to a maximum amplitude of the reciprocation motion on the basis of the pitching data, and
derive a central angle of the simple pendulum motion as the inclination angle using the predetermined width dimension of the traveling object, the obtained frequency of the simple pendulum motion, the obtained frequency of the reciprocation motion, and an angle formed between (a) a virtual straight line passing through a virtual center of gravity and an axle center of the traveling object and (b) an axle position line.

11. The inclination angle calculation device of claim 10, wherein the arithmetic device is further adapted to calculate the central angle according to an expression showing a relation among the predetermined width dimension of the traveling object, the obtained frequency of the simple pendulum motion, the obtained frequency of the reciprocation motion, and the central angle of the simple pendulum motion.

12. The inclination angle calculation device according to claim 11, wherein when the predetermined width dimension of the traveling object is b, the obtained frequency of the simple pendulum motion is v, the obtained frequency of the reciprocation motion is v', and the central angle of the simple pendulum motion is $\alpha$, the angle formed between the virtual straight line and the axle position line is $\alpha_0$, the expression is represented by a formula:

$$\cos^2\alpha_0 + \frac{g^2}{4\pi^2 v^2 v'^2 b^2}\cos\alpha_0 - 1 = 0$$

$$\frac{4\pi^4 v^2 v'^2 b^2}{g^2}\sin^2\alpha - \cos\alpha\sin^2(\alpha_0 - \alpha) - \sin\alpha\sin(\alpha_0 - \alpha)\cos(\alpha_0 - \alpha) = 0.$$

13. The inclination angle calculation device of claim 10, wherein the inclination angle calculation device is partially incorporated into a center-of-gravity detection device, wherein the arithmetic device calculates the location of the center of gravity of the traveling object in the cross-section surface, based on the predetermined width dimension of the traveling object, the obtained frequency of the simple pendulum motion, the obtained frequency of the reciprocation motion, and the central angle of the simple pendulum motion.

14. The inclination angle calculation device according to claim 1, wherein the motion detector includes a biaxial angular velocity sensor, an amplifier circuit, a filter circuit, and a digitizer circuit, the biaxial angular velocity sensor being mounted on the traveling object such that at least one axis is orthogonal to a travel direction of the traveling object.

* * * * *